United States Patent [19]
Mashimo

[11] Patent Number: 5,260,917
[45] Date of Patent: Nov. 9, 1993

[54] SIGNAL REPRODUCTION APPARATUS
[75] Inventor: Akira Mashimo, Tokorozawa, Japan
[73] Assignee: Teac Corporation, Japan
[21] Appl. No.: 535,896
[22] Filed: Jun. 11, 1990
[30] Foreign Application Priority Data
  Jun. 13, 1989 [JP] Japan .................. 1-149789
[51] Int. Cl.⁵ .................. G11B 7/00; G11B 5/09
[52] U.S. Cl. .................. 369/59; 369/124; 360/40; 360/32
[58] Field of Search ........... 369/59, 124; 360/40, 360/54, 32; 371/52, 55, 57.2

[56] References Cited
U.S. PATENT DOCUMENTS

| 4,088,876 | 5/1978 | Rege | 371/57.2 |
| 4,498,177 | 2/1985 | Larson | 371/52 |
| 4,646,281 | 2/1987 | Verboom | 369/59 |
| 5,016,258 | 5/1991 | Tanaka et al. | 371/55 |
| 5,042,037 | 8/1991 | Endoh | 371/57.2 |

Primary Examiner—W. R. Young
Assistant Examiner—P. W. Huber
Attorney, Agent, or Firm—Andrus, Sceales, Starke & Sawall

[57] ABSTRACT

A signal reproduction apparatus reproduces data from an information recording disc. The data is recorded for every data block and is modulated so that data in one data block has n (n is an integer) bits including arbitrary m (m is integer and less than the n) bits each having an active value. The signal reproduction apparatus includes, a reading circuit reading out the data from the information recording disc, a converter converting the data into a pulse signal for every data block, the pulse signal having an active pulse corresponding to the active value of the data and an inactive pulse corresponding to the inactive value of the data, a judgment circuit judging whether or not the pulse signal has m active pulses for every data block, and a correction circuit correcting the pulse signal so that the pulse signal has m active pulses in one data block when the judgment circuit judges that the pulse signal has a number of active pulses other than the m in the one data block.

7 Claims, 5 Drawing Sheets

SIGNAL REPRODUCTION APPARATUS

BACKGROUND OF THE INVENTION

The present invention generally relates to a signal reproduction apparatus, and more particularly to an apparatus reproducing a signal from a rotary recording and reproducing medium on which a modulated signal is recorded.

When information is recorded on a rotary recording and reproducing medium such as an optical magnetic disc and an optical disc (hereinafter termed a disc), an original data is modulated in accordance with a predetermined role, and data which is obtained by modulating the original data is recorded on the disc.

For example, a modulation method such as a four out of eleven modulation (4/11 modulation) and a four out of fifteen modulation (4/15 modulation) is proposed.

Figure 1:
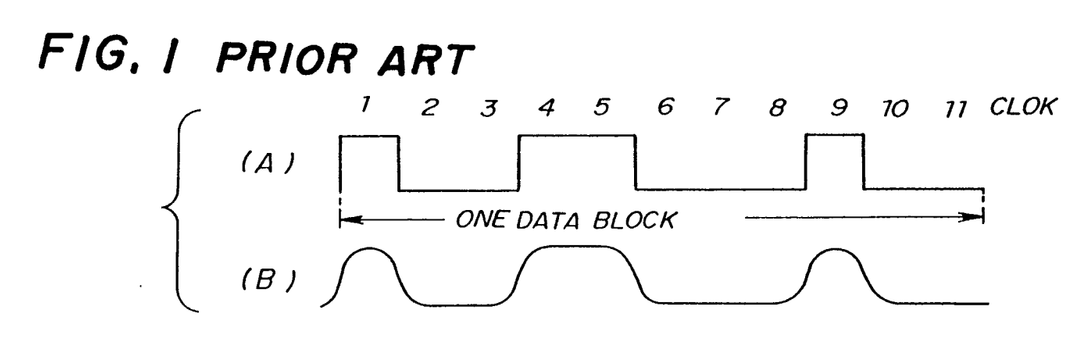
FIG. 1 shows wave forms of a signal which is modulated by using the four out of eleven modulation method and a detecting signal from the disc.

In data modulated by using the four out of eleven modulation method, one data block of the data has eleven bits, and each of the eleven bits corresponds to a cycle of a predetermined clock pulse. Then, the data in which four bits out of eleven bits are active (for example, "1") in the one data block, as shown in FIG. 1(A), is recorded on the disc. In the four out of fifteen modulation, as in the case of the four out of eleven modulation, one data block has fifteen bits, and the one data block is expressed so that four bits out of the fifteen bits are active (for example, "1").

In such modulations, in general, one data block has n bits and is expressed so that m bits out of n bits are active, where m and n($>$m) are integers.

A signal reproduction apparatus reproduces data by one data block from the disc on which data modulated as shown in FIG. 1(A) is recorded.

Figure 2:
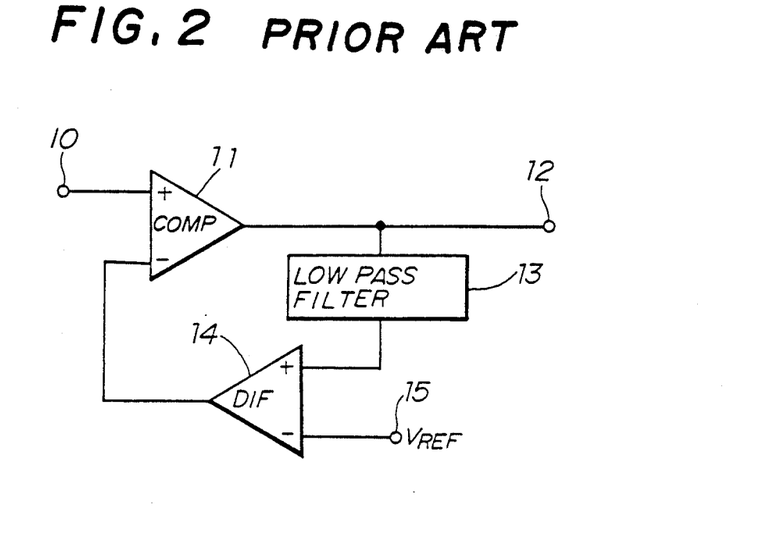
FIGS. 2 and 3 are block diagrams showing examples of the conventional signal reproduction apparatus.

FIG. 2 shows an example of a conventional signal reproduction apparatus reproducing data which is modulated in accordance with the four out of eleven modulation.

A detection signal which is detected from the disc by an optical head (which is not shown in FIG. 2) inputs to an input terminal 10. The detection signal, for example, has a wave form as shown in FIG. 1(B). The detection signal is supplied through the input terminal 10 to a non-inverting terminal(+) of a comparator 11. The comparator 11 compares the detection signal with a reference voltage which is applied to an inverting terminal(−) thereof. An output signal of the comparator 11 has a high level (V volt) when a level of the detection signal is greater than or equal to the reference voltage, and the output signal thereof has a low level (0 volt) when the level of the detection signal is less than the reference voltage. The output signal of the comparator 11 inputs to a low pass filter 13. The low pass filter 13 integrates the output signal of the comparator 11 and outputs an average voltage obtained by integrating the output signal of the comparator 11. The average voltage is applied to a differential amplifier 14. The differential amplifier 14 outputs a voltage corresponding to a difference between the average voltage from the low pass filter 13 and a reference voltage $V_{REF}$ applied through a terminal 15 from a controller (which is not shown in FIG. 2). The reference voltage $V_{REF}$ is, for example, equal to $4 \times V/11$ volts in the case of the four out of eleven modulation (4/11 modulation). V expresses a high level voltage of the output signal of the comparator 11. Then, an output voltage from the differential amplifier 14 is applied to the inverting terminal(−) of the comparator 11 so that the average voltage output from the low pass filter 13 becomes $4 \times V/11$. Thus, the comparator 11 inputting the detection signal such as shown in FIG. 1(B) outputs a pulse signal having a wave form in which an upper level is V volts and a lower level is 0 volt, as shown in FIG. 1(A). That is, the signal reproduction apparatus shapes the detection signal such as that shown in FIG. 1(B) and outputs a reproduction signal which has a rectangular wave form such as that shown in FIG. 1(A). The signal output from the comparator 11 is applied through an output terminal 12 of this signal reproduction apparatus to a demodulation circuit (which is not shown in FIG. 2).

A method of reproducing the signal by using a circuit such as that shown in FIG. 2 is termed a comparator reproduction method.

Figure 3:
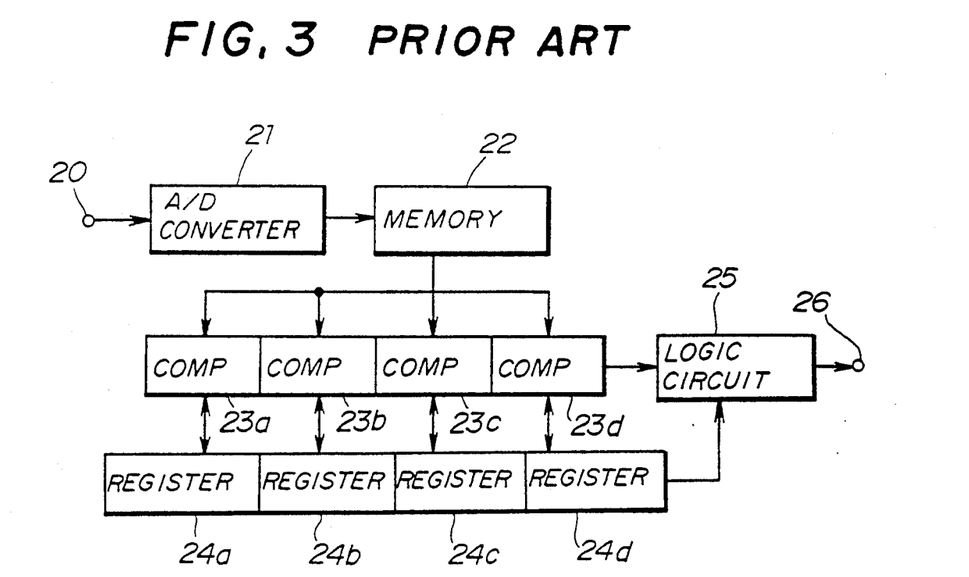

FIG. 3 shows another example of a conventional signal reproduction apparatus reproducing a signal which is also modulated in accordance with the four out of eleven modulation. A method of reproducing the signal by a circuit such as that shown in FIG. 3 is termed a maximum likelihood reproduction method.

A detection signal which is detected from the disc by an optical head and has a wave form such as that shown in FIG. 1(B) inputs to an input terminal 20. The detection signal is converted to digital data by an analog-to-digital converter 21 in synchronism with a predetermined clock signal which has a cycle corresponding to one bit in one data block of the modulated data. That is, the analog-to-digital converter 21 samples the detection signal in synchronism with the clock signal. Eleven sampling values which are sampled for one data block of the data are stored in a memory 22. Each of the cycles of the eleven samplings corresponds to one bit in the one data block. Four sampling values of eleven sampling values are stored in registers 24a through 24d, then, each of the remaining seven sampling values in the memory 22 is compared with each of the four sampling values stored in the registers 24a through 24d by each of four comparator 23a through 23d. When each of the remaining seven sampling values in the memory 22 is greater than one of the four sampling values stored in the registers 24a through 24d, each of the sampling values in the memory 22 is newly stored in a corresponding one of the four registers 24a through 24d. Then, when comparison processes in the comparators 23a through 23d over all of the seven sampling values finish, the four registers 24a through 24d have the greatest four sampling values among the eleven sampling values. A logic circuit 25 controls the four comparators 23a through 23d and four registers 24a through 24d so that the processes described above are performed, and stores information related to a position of the bit in the one data block of the recording data corresponding to each of the greatest four sampling values in the registers 24a through 24d. When the process for one data block of the data has finished, all of the four registers 24a through 24d are reset and "0" data is stored in each of the four registers 24a through 24d. Then, the logic circuit 25 outputs a reproduction signal, for every data block, in which only four blocks corresponding to the greatest four sampling values stored in four registers 24a through 24d are active, as shown in FIG. 1(A). The reproduction signal from the logic circuit 25 is supplied through an output terminal 26 to the demodulation circuit.

In the conventional signal reproduction apparatus to which the comparator reproduction method is applied, a circuit structure is simple. However, this conventional signal reproduction apparatus is not accurate for reproducing the signal, so that if a condition for reproducing a signal from the disc becomes worse errors occur in the reproduction signal. That is, in the case of the four out of eleven modulation, there is a disadvantage in that in the reproduced signal corresponding to the one data block, the number of active bits are more or less than four.

The other conventional signal reproduction apparatus to which the maximum likelihood reproduction method is applied is very accurate so that no errors of reproduction occur. However, in the other conventional signal reproduction apparatus, it is necessary to use many parts such as comparators and registers, and a logic of the logic circuit 25 is also complex.

SUMMARY OF THE INVENTION

Accordingly, a general object of the present invention is to provide a novel and useful signal reproduction apparatus, in which the disadvantages of the aforementioned prior art are eliminated.

A more specific object of the present invention is to provide a signal reproduction apparatus in which the circuit structure is simple and it is possible to reproduce a signal accurately.

The above objects of the present invention can be achieved by a signal reproduction apparatus for reproducing data from an information recording disc, the data being recorded for every data block and being modulated so that data in one data block has n (n is an integer) bits including arbitrary m (m is integer and less than the n) bits each having an active value and (n−m) bits each having an inactive value, the signal reproduction apparatus comprising, reading means for reading out the data from the information recording disc, converting means, coupled to the reading means, for converting the data from the reading means into a pulse signal for every data block, the pulse signal changing in accordance with values of the data and having an active pulse corresponding to the active value of the data and an inactive pulse corresponding to the inactive value of the data, judgment means, coupled to the converting means, for judging whether or not the pulse signal has m active pulses for every data block of the data, and correction means, coupled to the judgment means, for correcting the pulse signal so that the pulse signal has m active pulses in one data block when the judgment means judges that the pulse signal has a number of active pulses other than the m in the one data block and for passing the pulse signal when the judgment means judges that the pulse signal has m active pulses, the pulse output from the correction means representing data reproduced from the information recording disc.

DESCRIPTION OF THE PREFERRED EMBODIMENTS

A description will now be given of a preferred embodiment of the present invention with reference to FIGS. 4 through 6.

Figure 4:
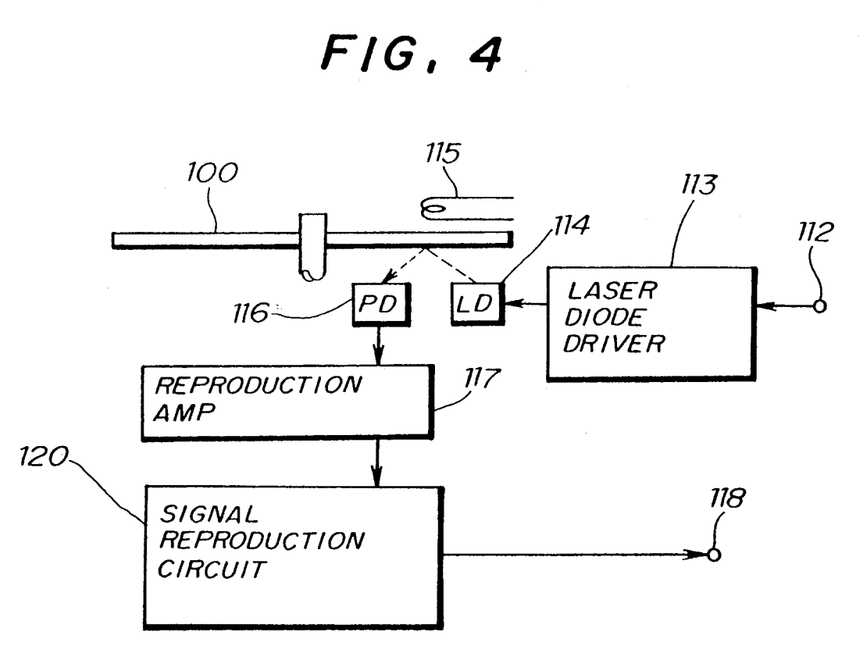
FIG. 4 is a block diagram showing the fundamental structure of a signal reproduction apparatus.
Figure 5:
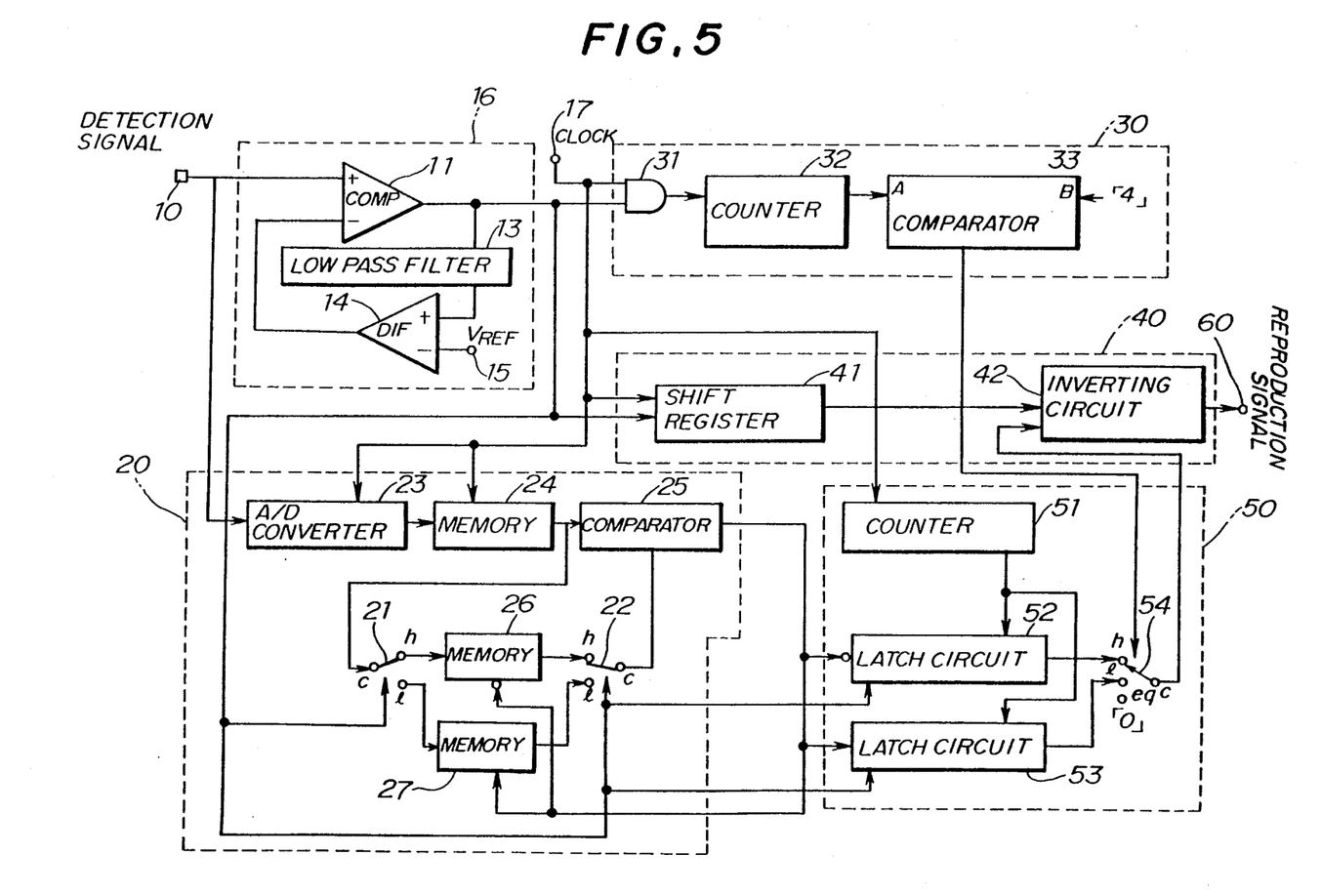
FIG. 5 is a block diagram showing a preferred embodiment of the present invention.

In FIG. 4, an optical magnetic disc 100 rotates in a fixed speed. At a time of recording, a recording signal which is modulated by using the four out of eleven modulation method (4/11 modulation) is applied through an input terminal 112 to a laser diode driver 113. The laser diode driver 113 drives a laser diode 114 (LD) so that it emits a light beam having an intensity based on the modulated recording signal. At a time of reproducing, the laser diode driver 113 drives the laser diode 114 so that it emits a light beam having a constant intensity. The light beam emitted from the laser diode 114 is projected onto a surface of the optical magnetic disc 100.

At the time of recording, a coercive force decreases at a portion of the optical magnetic disc 100 onto which the light beam having an intensity corresponding to recording data "1" is projected. Then, the direction of magnetization at the portion is inverted by a recording magnetic coil 115 so that information expressing "1" is recorded on the portion of the optical magnetic disc 100. At the time of reproducing, a plane of the polarization of a light beam reflected by the optical magnetic disc 100 rotates according to the direction of magnetization so that an intensity of the reflected beam changes. A photo diode 116 (PD) detects the reflected beam. The photo diode 116 outputs a detection signal having a level corresponding to the intensity of the reflected beam input to it. A reproduction amplifier 117 amplifies the detection signal output from the photo diode 116. An output signal from the reproduction amplifier 117 is supplied to a signal reproduction circuit 120. The signal reproduction circuit 120 outputs a reproduction signal, then, the reproduction signal is supplied through a terminal 118 to a demodulation circuit (not shown in FIG. 4).

A description will now be given of an example of the structure of the signal reproduction circuit 120 with reference to FIG. 5.

A comparator reproduction circuit 16 includes, in the same manner as in FIG. 2, the comparator 11, the low pass filter 13 and the differential amplifier 14 to which the reference voltage $V_{REF}$ is supplied through the terminal 15. The detection signal is supplied through the input terminal 10 to the comparator reproduction circuit 16. The comparator reproduction circuit 16 generates a pulse signal as has been described in FIG. 2. The pulse signal has an active pulse (for example, high level) corresponding to the active value of the data and an inactive pulse (for example, low level) corresponding to the inactive value of the data. That is, the pulse signal has, for example, a wave form such as that shown in FIG. 1(A). The pulse signal output from the comparator reproduction circuit 16 is supplied to switches 21, 22 in a comparing circuit 20, an AND circuit 31 in a checking circuit 30 and a shift register 41 in a correction circuit 40.

In the comparing circuit 20, the detection signal is supplied through the input terminal 10 to an analog-to-digital converter 23. The analog-to-digital converter 23 converts the detection signal to digital data in synchronism with a predetermined clock signal. That is, the analog-to-digital converter 23 samples the detection signal in synchronism with the clock signal. The digital data output from the analog-to-digital converter 23 express sample values of the detection signal. The clock signal is generated by an external clock generator (not shown in FIG. 5) and is input to a terminal 17. A cycle of the clock signal corresponds to one bit in one data block of the recording data modulated by using the four out of eleven modulation method (4/11 modulation). Each of the sampling values output from the analog-to-digital converter 23 is stored in a memory 24 in synchronism with the clock signal. Each of the sampling values stored in the memory 24 is read out from the memory 24 and is supplied to a common terminal (c) of the switch 21 and a comparator 25. The switch 21 has the common terminal (c) and terminals (h) and (l). The terminal (h) is connected to a memory 26 and the terminal (l) is connected to a memory 27. A switch 22 also has a common terminal (c) and terminals (h) and (l). The common terminal (c) is connected to the comparator 25, the terminal (h) is connected to the memory 26 and the terminal (l) is connected to the memory 27. Each of the switches 21 and 22 selects the terminal (h) when the level of the pulse signal output from the comparator reproduction circuit 16 is high, and selects the terminal (l) when the level of the pulse signal is low. The sampling value read out from the memory 24 is stored through the switch 21 in the memory 26 or 27. A sampling value read out from the memory 26 or 27 is supplied through the switch 22 to the comparator 25. The comparator 25 compares a sampling value from the memory 24 with a sampling value from the memory 26 or 27. Then, when the sampling value from the memory 24 is greater than or equal to the sampling value from the memory 26 or 27, the comparator 25 outputs a comparison result signal having a high level, and when the sampling value from the memory 24 is less than the sampling value from the memory 26 or 27, the comparator 25 outputs a comparison result signal having a low level. When each of the switches 21 and 22 selects the terminal (h) and the level of the comparison result signal output from the comparator 25 is low, a sampling value read out from the memory 24 is stored in the memory 26. On the other hand, when each of the switches 21 and 22 selects the terminal (l) and the level of the comparison result signal output from the comparator 25 to the memory 27 is high, a sampling value read out from the memory 24 is stored in the memory 27.

When the level of the pulse signal output from the comparator reproduction circuit 16 is high, a new sampling value which is sampled by the analog-to-digital converter 23 and is stored in the memory 24 is compared by the comparator 25 with a sampling value which has been stored in the memory 26 before then. If the new sampling value is less than the sampling value stored in the memory 26, the new sampling value is stored in the memory 26 instead of the sampling value being stored all this while in the memory 26. If the new sampling value is greater than or equal to the sampling value stored in the memory 26, the sampling value stored in the memory 26 is maintained as it is.

On the other hand, when the level of the pulse signal output from the comparator reproduction circuit 16 is low, a new sampling value stored in the memory 24 is compared by the comparator 25 with a sampling value which has been stored in the memory 27 before then. If the new sampling value is greater than the sampling value stored in the memory 27, the new sampling value is stored in the memory 27 instead of the sampling value being stored all this while in the memory 27. If the new sampling value is less than or equal to the sampling value stored in the memory 27, the sampling value stored in the memory 27 is maintained as it is.

Accordingly, when the processes for one data block of the recording data in the comparing circuit 20 have been performed, the smallest sampling value among sampling values which are sampled by the analog-to-digital converter 23 when the level of the pulse signal output from the comparator reproduction circuit 16 is high (active pulse) is finally stored in the memory 26. That is, the smallest sampling value is greater than the reference voltage $V_{REF}$ used in the comparator reproduction circuit 16, and is closest to the reference voltage $V_{REF}$ among sampling values obtained when the level of the pulse signal is high. Then, the greatest sampling value among sampling values which are sampled by the analog-to-digital converter 23 when the level of the pulse signal output from the comparator reproduction circuit 16 is low (inactive pulse) is finally stored in the memory 27. That is, the greatest sampling value is less than the reference voltage $V_{REF}$ and is closest to the reference voltage $V_{REF}$ among sampling values obtained when the level of pulse signal is low. When all processes for one data block of the data are finished, memories 26 and 27 are reset, then a process for the next data block.

In the checking circuit 30, when the level of the pulse signal output from the comparator reproduction circuit 16 is high, the clock signal from the terminal 17 is supplied through the AND circuit 31 to a counter 32. The counter 32 counts the clock signal supplied through the AND circuit 31 to it. That is, the counter 32 counts the number of active pulses (the level of the pulse signal is high) for one data block. A count value of the counter 32 by one data block is input to a comparator 33.

The comparator 33 compares the count value with a predetermined value "4". Then, when the count value is greater than "4" the comparator 33 outputs a first control signal, when the count value is less than "4" the comparator 33 outputs a second control signal, and when the count value is equal to "4" the comparator 33 outputs a third control signal. Either the first control signal, the second control signal, or the third control signal is supplied to a switch 54 in a correction indication circuit 50. The counter 32 is reset at the end of every processes for one data block.

The shift register 41 has stages of 11 bits. The shift register 41 shifts level values (V volts or 0 volt) of the pulse signal output from the comparator reproduction circuit 16 in synchronism with the clock signal from the terminal 17. Each of the level values corresponding to one bit in one data block output from the shift register 41 is input to an inverting circuit 42.

In the correction indication circuit 50, a counter 51 counts the clock signals from the terminal 17 and supplies a count value to latch circuits 52 and 53 by one count. The latch circuit 52 holds a count value of the counter 51 when the level of the pulse signal output from the comparator reproduction circuit 16 is high and the comparison result signal output from the comparator 25 is low. The latch circuit 53 holds a count value of the counter 51 when the level of the pulse signal output from the comparator reproduction circuit 16 is low and the level of the comparison result signal is high. That is, the count value held in the latch circuit 52 expresses the position of a pulse in the pulse signal for one data block. The pulse corresponds to the smallest sampling value stored in the memory 26. The count value held in the latch circuit 53 also expresses the position of a pulse in the pulse signal for one data block. The pulse corresponds to the greatest sampling value stored in the memory 27. The counter 51 is reset at the end of every processes for one data block.

The switch 54 has a common terminal (c) and terminals (h), (l) and (eq). The count value output from the latch circuit 52 is input to the terminal (h). The count value output from the latch circuit 53 is input to the terminal (l). "0" is supplied to the terminal (eq). When the count value of the counter 32 is greater than "4" and the switch 54 receives the first control signal output from the comparator 33, the switch 54 selects the terminal (h). When the count value of the counter 32 is less than "4" and the switch 54 receives the second control signal output from the comparator 33, the switch 54 selects the terminal (l). When the count value of the counter 32 is equal to "4" and the switch 54 receives the third control signal output from the comparator 33, the switch 54 selects the terminal (eq). One of the count values input to the terminals (h) and (l) or "0" input to the terminal (eq) is supplied through the common terminal (c) to the inverting circuit 42.

The inverting circuit 42 successively inputs a pulse train output from the shift register 41. Then, the inverting circuit 42 inverts the level value of the pulse train at a cycle corresponding to the position of a block identified by the count value supplied from the switch 54.

At another cycle, the inverting circuit 42 outputs the pulse train as it is. When the inverting circuit 42 receives "0" from the switch 54, it does not invert the level value of the pulse train output from the comparator reproduction circuit 16 and outputs the pulse train as it is. The pulse train output from the inverting circuit 42 is supplied, as a reproduction signal, through a terminal 60 to the terminal 118 (refer to FIG. 4) connected to the demodulation circuit.

Figure 6:
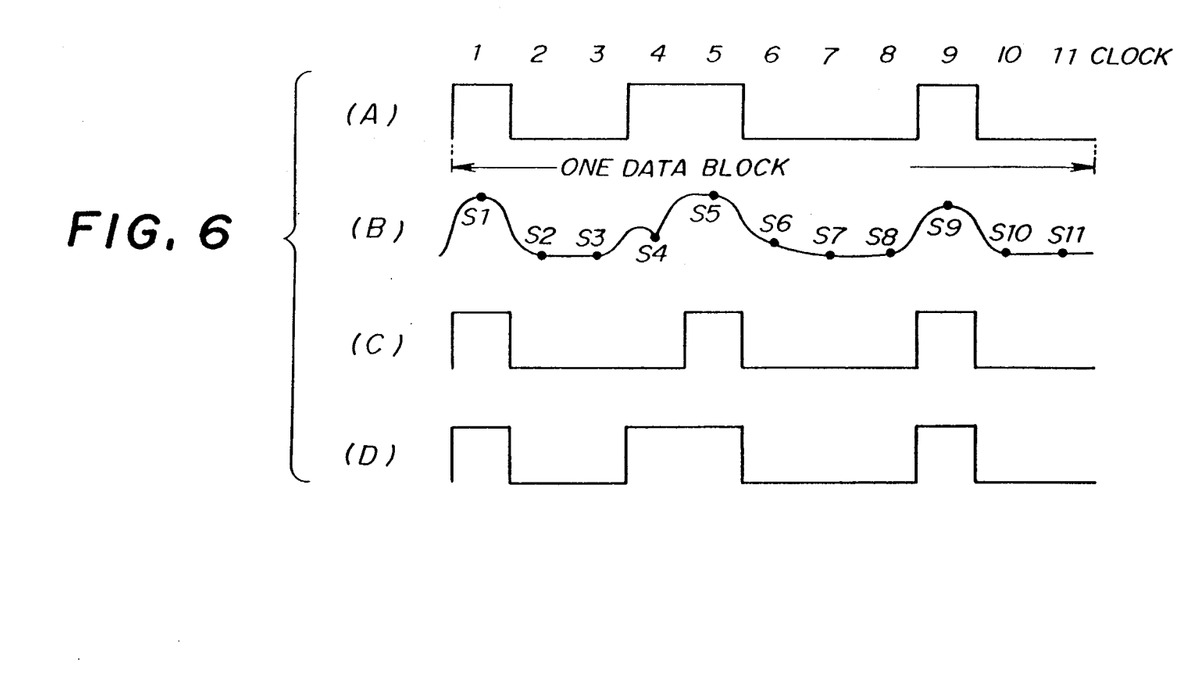
FIG. 6 is a wave form chart showing a detection signal and reproducing signals in the circuit shown in FIG. 5.

When the signal modulated by using the four out of eleven modulation method (4/11 modulation) is reproduced as has been described above, the level of the pulse signal output from the comparator reproduction circuit 16 is normally high during four cycles of the eleven cycles as shown in FIG. 6(A). If the number of cycles, when the level of the pulse signal output from the comparator reproduction circuit 16 is high, is greater than "4", at a cycle giving the smallest sampling value in the sampling values sampled when the level of the pulse signal is high, the level value of the pulse train output from the shift register 41 is changed to low. If the number of cycles, when the level of the pulse signal output from the comparator reproduction circuit 16 is high, is less than "4", at a cycle giving the greatest sampling value in the sampling values sampled when the level of the pulse signal is low, the level value of the pulse train output from the shift register 41 is changed to high. Thus, the reproduction signal output from the inverting circuit 42 is always high during four cycles of the eleven cycles.

A description will now be given of an example of the processes with reference to FIG. 6.

For example, the modulated signal as shown in FIG. 6(A) has been recorded on the disc. The detection signal detected by the photo diode 116 from the disc has a wave form as shown in FIG. 6(B). The detection signal is sampled by the analog-to-digital converter 23. The eleven sampling values for one data block are S1, S2, S3, ..., $S_{11}$. The sampling value S4 is less than the level of $4 \times V/11$ and is not a low level so that the pulse signal output from the comparator reproduction circuit 16 has a wave form as shown in FIG. 6(C). Thus, the pulse, in the pulse signal (in FIG. 6(C)), corresponding to the sampling value S4 is an error pulse. In this case, the sampling value S4 is stored in the memory 27. The count value "4" corresponding to the cycle number of the clock signal when S4 is sampled is held in the latch circuit 53. Each of the cycle numbers "1" through "11" corresponds to a position of the bit in one data block. The count value of the counter 32 is "3". Since this count value is less than "4", the inverting circuit 42, on the base of the count value "4" held in the latch 53, inverts the level value of the pulse signal during fourth cycle. That is, in the pulse signal shown in FIG. 6(C), the low level value (0 volt) during the fourth cycle of the clock signal is changed to the high level (V volts). Thus, the inverting circuit 42 outputs the reproduction signal as shown in FIG. 6(D). The wave form of this reproduction signal becomes the same as the wave form of the modulated signal.

As has been described above, according to the embodiment, the reproduction signal can be exactly obtained. In addition, the logic in the comparing circuit 20, the checking circuit 30, the correction circuit 40 and the correction indication circuit 50 is simple.

In this embodiment, a description was given of the case where the data modulated by using the four out of eleven modulation method (4/11 modulation) was recorded on the disc. If the data modulated by the four out of fifteen modulation method (4/15 modulation) is recorded on the disc, the signal reproduction apparatus is made up of circuits in the same manner as the case of the four out of eleven modulation (4/11 modulation). The modulation method of the signal recorded on the disc is not limited.

According to the present invention, the circuit structure of the signal reproduction apparatus is simple and it is possible to reproduce a modulated signal exactly.

The present invention is not limited to the aforementioned embodiments, and variations and modifications may be made without departing from the scope of the claimed invention.

What is claimed is:

1. A signal reproduction apparatus for reproducing data from an information recording disc, said data being recorded for every data block and being modulated in accordance with an m/n modulation method in which data in one data block having n bits (n is an integer) is modulated so as to have arbitrary m (m is an integer less than n) bits each having an active value and (n−m) bits each having an inactive value, said signal reproduction apparatus comprising:

reading means for reading out said data from said information recording disc;

converting means, coupled to said reading means, for converting said data from said reading means into a pulse signal for every data block, said pulse signal changing in accordance with values of said data and having an active pulse corresponding to an active value of said data and an inactive pulse corresponding to an inactive value of said data;

judgment means, coupled to said converting means, for judging whether or not said pulse signal has m active pulses for every data block of said data wherein said judgment means includes counter means for counting a number of active pulses in said pulse signal for every data block of said data and comparator means for comparing a count value of said counter means with said m, a result of comparing in said comparator means representing a result of judging in said judgment means;

wherein said comparator means gives a first result when the count value of said counter means is greater than said m, a second result when the count value of said counter means is less than said m and a third result when the count value of said counter means is equal to said m; and correction means, coupled to said judgment means, for correcting said pulse signal so that said pulse signal has m active pulses in one data block when said judgment means judges that said pulse signal has a number of active pulses other than m in said one data block and for passing said pulse signal when said judgment means judges that said pulse signal has m active pulses, the pulse output from said correction means representing data reproduced from said information recording disc.

2. A signal reproduction apparatus as claimed in claim 1, wherein said correction means includes:

first means for correcting said pulse signal when said comparator means gives said first result, and second means for correcting said pulse signal when said comparator means gives said second result;

said first means having first error detection means for detecting a first error pulse in said pulse signal, said first error pulse being an active pulse which differs from an original inactive pulse corresponding to the inactive value of the data, and first pulse converting means for converting said first error pulse into said original inactive pulse;

said second means having second error detection means for detecting a second error pulse in said pulse signal, said second error pulse being an inactive pulse which differs from an original active pulse corresponding to the active value of the data, and second pulse converting means for converting said second error pulse into said original active pulse.

3. A signal reproduction apparatus as claimed in claim 2, wherein said first error detection means includes a first error position detection means for detecting a first error position where said first error pulse is positioned in said pulse signal for every data block of said data, and said first pulse converting means includes first pulse inverting means for inverting a pulse in the pulse signal positioned at said first error position in said pulse signal.

4. A signal reproduction apparatus as claimed in claim 2, wherein said second error detection means includes a second error position detection means for detecting a second error position where said second error pulse is positioned in said pulse signal for every data block of said data, and said second pulse converting means includes second pulse inverting means for inverting a pulse positioned at said second error position in said pulse signal.

5. A signal reproduction apparatus for reproducing data from an information recording disc, said data being recorded for every data block and being modulated in accordance with an m/n modulation method in which data in one data block having n bits (n is an integer) is modulated so as to have arbitrary m (m is an integer less than n) bits each having an active value and (n−m) bits each having an inactive value, said signal reproduction apparatus comprising:

reading means for reading out said data from said information recording discs, wherein said reading means includes detection means for outputting a detection signal corresponding to said data, said detection signal changing in accordance with values of said data;

converting means, coupled to said reading means, for converting said data from said reading means into a pulse signal for every data block, said pulse signal changing in accordance with values of said data and having an active pulse corresponding to an active value of said data and in inactive pulse corresponding to an inactive value of said data, wherein said converting means includes wave shaping means for shaping said detection signal output from said detection means into the pulse signal by using a predetermined reference level;

judgment means, coupled to said converting means, for judging whether or not said pulse signal has m active pulses for every data block of said data, said judgment means including a clock counter for counting a clock pulse having a cycle corresponding to a bit of said data when the active pulse corresponding to the active value of said data is output from said wave shaping means for every data block of said data;

a comparator comparing a count value of said clock counter with said m, said comparator outputting a first signal when the count value of said clock counter is greater than said m, a second signal when the count value of said clock counter is less than said m and a third signal when the count value of said clock counter is equal to said m, said first signal, said second signal and third signal representing results of judging in said judgment means; and correction means, coupled to said judgment means, for correcting said pulse signal so that said pulse signal has m active pulses in one data block when said judgment means judges that said pulse signal has a number of active pulses other than m in said one data block and for passing said pulse signal when said judgment means judges that said pulse signal has m active pulses, the pulse output from said correction means representing data reproduced from said information recording disc.

6. A signal reproduction apparatus as claimed in claim 5, wherein said correction means includes:

sampling means for sampling levels of said detection signal output from said detection means in synchronism with said clock pulse signal;

a first position detection means for detecting a first position for every block data of said data, said first position being a position of an active pulse, in said pulse signal from said wave shaping means, corresponding to a level which is closest to said predetermined reference level used in said wave shaping means among levels which are sampled by said sampling means when said wave shaping means outputs active pulses in each block data;

a second position detection means for detecting a second position for every block data of said data, said second position being a position of an inactive pulse, in said pulse signal form said wave shaping means, corresponding to a level which is closest to said predetermined reference level used in said wave shaping means among levels which are sampled by said sampling means when said wave shaping means outputs inactive pulses in each block data; and inverting means, when said comparator outputs said first signal, for inverting an active pulse positioned at said first position in said pulse signal to an inactive pulse, when said comparator outputs said second signal, for inverting an inactive pulse positioned at said second position in said pulse signal to an active pulse, and when said comparator outputs said third signal, for passing said pulse signal.

7. A signal reproduction apparatus as claimed in claim 5, wherein said active pulse is a high level pulse and said inactive pulse is low level pulse, said correction means includes:

sampling means for sampling levels of said detection signal output from said detection means in synchronism with said clock pulse signal;

determination means for determining the smallest level among levels which are sampled by said sampling means for one data block when said wave shaping means outputs high level pulses, and for determining the greatest level among levels which are sampled by said sampling means for one data block when said wave shaping means outputs low level pulses;

correction indication means indicating a correction position in said pulse signal for one data block, said correction indication means having position detecting means for detecting a first position, in said pulse signal for one data block, where the smallest level is sampled by said sampling means when said wave shaping means outputs high level pulses and for detecting a second position, in said pulse signal for one data block, where the greatest level is sampled by said sampling means when said wave shaping means outputs low level pulses, and selection means for selecting said first position when said comparator outputs said first signal, for selecting said second position when said comparator outputs said second signal, and for selecting a predetermined data when said comparator outputs said third signal, said first position, said second position or said predetermined data representing said correction position;

inverting means for inverting a high level pulse positioned at said first position in said pulse signal to a low level pulse when said correction indication means indicates said first position, for inverting a low level pulse positioned at said second position in said pulse signal to high level pulse when said correction indication means indicates said second position, and for passing said signal when said correction indication means indicates said predetermined data.

* * * * *